W. A. HAGER.
ANIMAL POKE.
APPLICATION FILED JAN. 31, 1913.
1,157,529.
Patented Oct. 19, 1915.
2 SHEETS—SHEET 1.
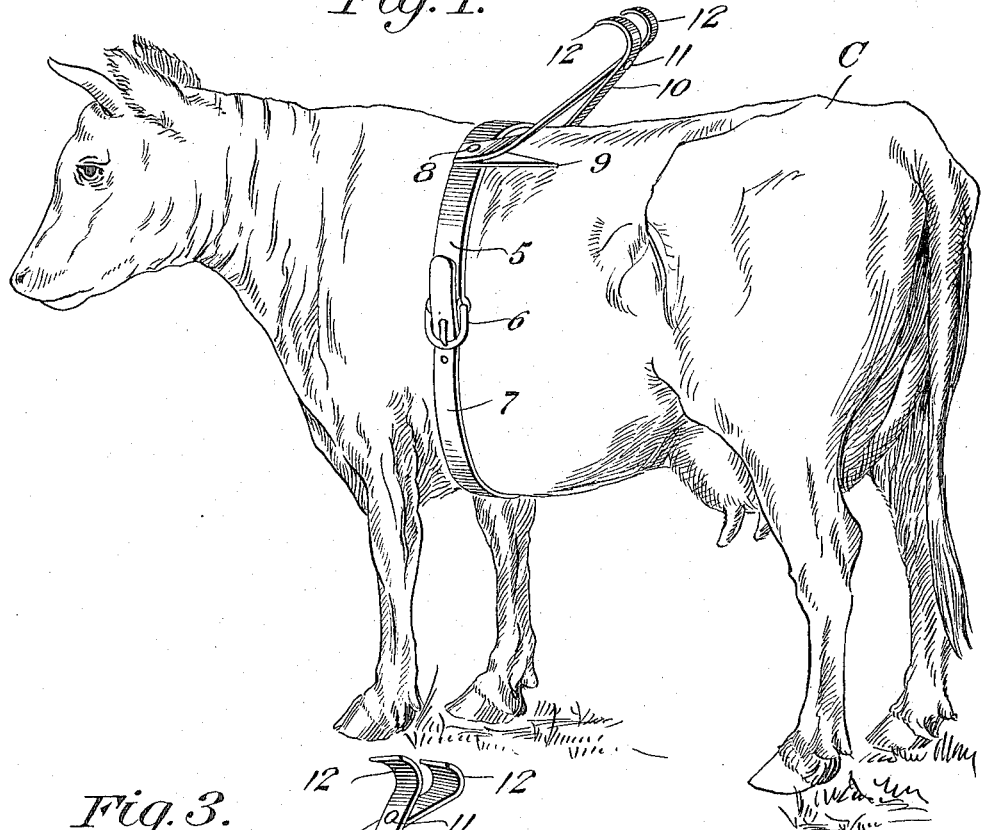
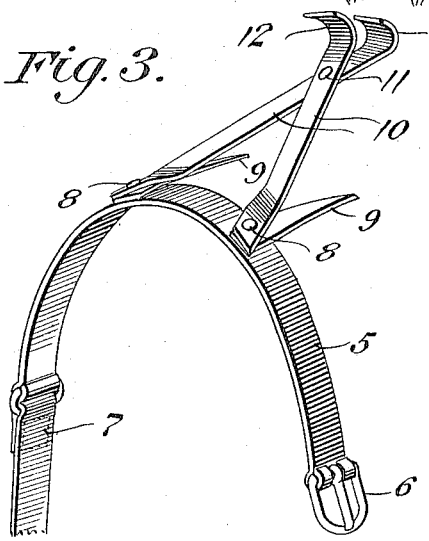
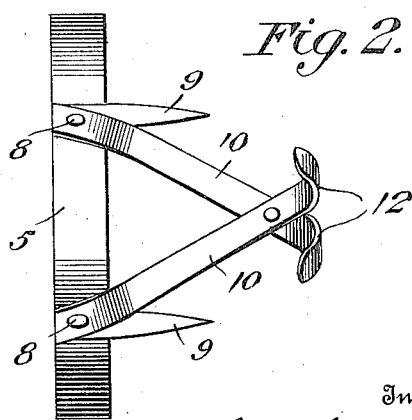
Witnesses
Inventor
W. A. Hager
By Victor J. Evans
Attorney

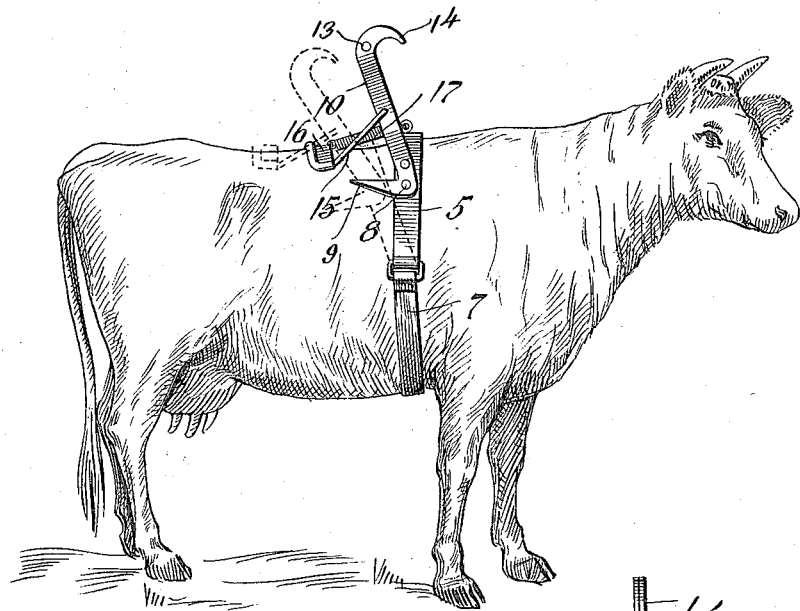
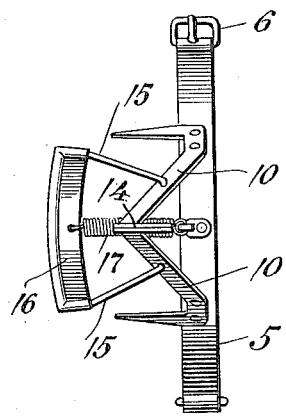
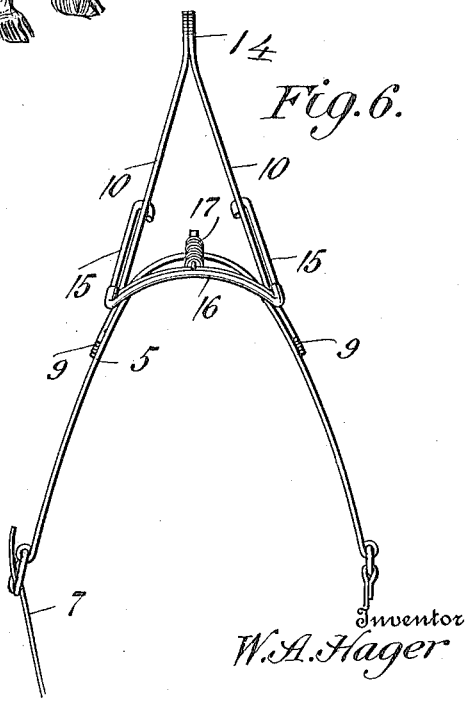

UNITED STATES PATENT OFFICE.

WILLIAM A. HAGER, OF TEXHOMA, OKLAHOMA.

ANIMAL-POKE.

1,157,529.  Specification of Letters Patent.  Patented Oct. 19, 1915.

Application filed January 31, 1913. Serial No. 745,464.

*To all whom it may concern:*

Be it known that I, WILLIAM A. HAGER, a citizen of the United States, residing at Texhoma, in the county of Texas and State of Oklahoma, have invented new and useful Improvements in Animal-Pokes, of which the following is a specification.

This invention relates to animal pokes, and it has for its object to produce a poke of simple and improved construction by the use of which an animal shall be prevented from going through a fence by passing beneath or between the fence wires.

A further object of the invention is to provide a device of this class which, while simple in construction and effective in use, shall be so arranged that it will not injure or discommode the animal wearing the same unless attempting to go through a fence.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the claims may be resorted to when desired.

In the drawings,—Figure 1 is a perspective view showing the animal to which the improved poke has been applied. Fig. 2 is a top plan view showing the poke detached. Fig. 3 is a perspective view showing the poke detached. Fig. 4 is a side elevation illustrating a modified form of the invention as applied to an animal and with dotted lines illustrating the operation of the same. Fig. 5 is a top plan view showing the modified form of the device detached. Fig. 6 is a rear elevation of the same.

Corresponding parts in the several figures are denoted by like characters of reference.

Referring to the drawings, 5 designates a saddle strap or band which is preferably made of metal such as band iron. Said saddle band is provided adjacent to one end with a fastening member, such as a buckle 6, and at the other end with a strap 7 adapted to engage said buckle for the purpose of securing the device in position upon the back of an animal, such as a cow C, as seen in Fig. 1. The back band or saddle 5 is curved to present an arch which will readily fit the back of the animal. Secured on the bridge portion of said arch or saddle by fastening members, such as rivets 8, are rearwardly extending prongs or barbs 9 which will normally lie flat upon the back of the animal and upwardly and rearwardly extending straps 10 may be arranged to cross each other, as seen in Figs. 1 to 3, inclusive, being connected together at the point of intersection by a rivet 11, or said straps may be secured together flatwise by a rivet 13, as seen in Figs. 4 to 6, inclusive. In Figs. 1 to 3, inclusive, the ends of the straps 10 are bent to form terminal hooks 12, and in Figs. 4 to 6, inclusive, the connected ends of the straps are shaped to form a single hook 14.

Under the modified construction illustrated in Figs. 4 to 6, inclusive, the straps 10 serve for the attachment of rearwardly extending pivoted arms 15 that are connected together by a back engaging pad 16 which latter is connected with the top of the arch or saddle member 5 by means of a coiled spring 17.

Many animals when young acquire the habit of crawling beneath or between the wires of pasture fences, especially when a fence consisting of but few strands is used and where the fence posts are a considerable distance apart; this regardless of whether plain or barbed fence wires are used. When an animal becomes older, it is difficult to break it of this habit because the wires even when barbed are not heeded by the animal. By applying the simple device herein described in the manner shown in Figs. 1 and 3 of the drawing, it is evident that when the animal attempts to pass beneath or between the fence wires, one of such wires is bound to become engaged by the hooks 12 or 14, as the case may be. The strain exercised upon said hooks will tilt the back band or saddle in a rearward direction, thus causing the prongs or barbs 9 to prick the animal which will thus be discouraged from the attempt to pass through the fence. It is evident that the pain inflicted by the prongs 9 will increase as long as the effort to go through the fence is continued, while as soon as such effort is discontinued, the pain will cease. Under the construction shown in Figs. 4 to 6, inclusive, the back engaging pad 16 actuated by the spring 17 will assist in restoring the device to a position in which the barbs 9 will be raised from engagement with the back of the animal as soon as backward strain against the hook 14 is discontinued. By this invention the animal will be quickly broken of the habit of going through fences, and the use of the device may then be discontinued.

It will be observed that in either form of my invention, while the animal equipped with the device is quietly grazing and is making no attempts to break through a fence, the prongs or barbs 9 will lie substantially flat on the back of the animal and will cause no discomfort whatever, being in this respect materially different from devices in which prongs or barbs are employed that are disposed obliquely or substantially at right angles with respect to the back of the animal and where such prongs, by the mere ordinary motions of the animal, are liable to prick and cause extreme discomfort. By the present invention no discomfort will be caused unless the animal endeavors to break through a fence, and in such case the discomfort will cease as soon as the effort to break through is discontinued. The animal will thus be quickly broken of the bad habit without causing the excrutiating suffering entailed by the use of some devices.

Having thus described the invention, what is claimed as new, is:—

1. In a device of the class described, a saddle member consisting of a rigid back engaging portion and a belly engaging strap, a back engaging prong connected with and lying in the plane of the back engaging portion, extending rearwardly therefrom and lying flatwise for substantially its entire length on the back of the animal to which the device is applied, and a hook member extending upwardly with respect to the back engaging portion and having a terminal hook turned forwardly whereby by the engagement of such hook with an obstruction the rigid back engaging portion of the saddle member will be tilted, causing the free end of the prong to be pressed downward.

2. In a device of the class described, a saddle member consisting of a rigid back engaging portion and a belly engaging strap, a back engaging prong connected with and lying in the plane of the back engaging portion, extending rearwardly therefrom and lying flatwise for substantially its entire length on the back of the animal to which the device is applied, and a hook member extending upwardly with respect to the back engaging portion and having a terminal hook turned forwardly whereby by the engagement of such hook with an obstruction the rigid back engaging portion of the saddle member will be tilted, causing the free end of the prong to be pressed downward; in combination with spring means for restoring the back engaging portion of the saddle member and related parts to normal position without being tilted.

In testimony whereof I affix my signature in presence of two witnesses.

WILLIAM A. HAGER.

Witnesses:
T. R. GOODMAN,
JAMES O. LYNCH.